United States Patent
Sugiura et al.

(10) Patent No.: US 7,531,265 B2
(45) Date of Patent: May 12, 2009

(54) FUEL CELL

(75) Inventors: Seiji Sugiura, Utsunomiya (JP);
Masaaki Nanaumi, Utsunomiya (JP);
Hiroshi Shinkai, Utsunomiya (JP);
Shuhei Goto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 658 days.

(21) Appl. No.: 11/061,189

(22) Filed: Feb. 17, 2005

(65) Prior Publication Data

US 2005/0186464 A1 Aug. 25, 2005

(30) Foreign Application Priority Data

Feb. 19, 2004 (JP) ............................. 2004-042746

(51) Int. Cl.
*H01M 8/02* (2006.01)
*H01M 8/10* (2006.01)

(52) U.S. Cl. .......................................... 429/36; 429/38

(58) Field of Classification Search ................... 429/38, 429/36
See application file for complete search history.

(56) References Cited

U.S. PATENT DOCUMENTS 5,187,025 A * 2/1993 Kelland et al. ................ 429/33

| | | | | |
|---|---|---|---|---|
| 2002/0127461 A1* | 9/2002 | Sugita et al. | .................. | 429/35 |
| 2003/0082430 A1* | 5/2003 | Suzuki | ........................ | 429/36 |
| 2004/0137304 A1* | 7/2004 | Tanaka et al. | ................. | 429/35 |
| 2004/0157099 A1* | 8/2004 | Kato et al. | .................... | 429/26 |
| 2004/0224212 A1 | 11/2004 | Wakahoi et al. | | |
| 2005/0084734 A1 | 4/2005 | Kobayashi et al. | | |

FOREIGN PATENT DOCUMENTS

| | | |
|---|---|---|
| DE | 102004022969 A1 | 12/2004 |
| EP | 1511103 A2 | 3/2005 |
| JP | 06-267564 | 9/1994 |
| JP | 07220742 A * | 8/1995 |
| JP | 2001-076746 | 3/2001 |
| JP | 2002237317 A * | 8/2002 |
| JP | 2002-373678 | 12/2002 |

OTHER PUBLICATIONS

IPDL Machine Translation of JP 2002-237317A.*
German Office Action for Application No. 102005007353.0, dated Jan. 9, 2007.

* cited by examiner

*Primary Examiner*—Gregg Cantelmo
(74) *Attorney, Agent, or Firm*—Lahive & Cockfield, LLP; Anthony A. Laurentano

(57) ABSTRACT

A fuel cell includes a membrane electrode assembly and first and second metal separators. The first metal separator has first outer protrusions provided outside an oxygen-containing gas flow field. The second metal separator has second outer protrusions provided outside a fuel gas flow field. The first and second protrusions sandwich outer edges of electrode catalyst layers.

6 Claims, 7 Drawing Sheets

FUEL CELL

BACKGROUND OF THE INVENTION

1. Field of the Invention

The present invention relates to a fuel cell including a membrane electrode assembly and a pair of separators sandwiching the membrane electrode assembly. The membrane electrode assembly includes an anode, a cathode, and an electrolyte membrane interposed between the anode and the cathode. The anode and the cathode include electrode catalyst layers provided respectively on both surfaces of the electrolyte membrane.

2. Description of the Related Art

For example, a solid polymer fuel cell employs a polymer ion exchange membrane as an electrolyte membrane. The solid polymer electrolyte membrane is interposed between an anode and a cathode to form a membrane electrode assembly. Each of the anode and the cathode is made of an electrode catalyst layer and a gas diffusion layer (e.g., porous carbon). The membrane electrode assembly is sandwiched between separators (bipolar plates) to form a power generation cell. In use, generally, a predetermined number of power generation cells are stacked together to form a fuel cell stack.

In the fuel cell, a fuel gas such as a gas chiefly containing hydrogen (hereinafter also referred to as the hydrogen-containing gas) is supplied to the anode. A gas chiefly containing oxygen such as the air (hereinafter also referred to as the oxygen-containing gas) is supplied to the cathode. The electrode catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In this type of the fuel cell, for example, the structure as disclosed in Japanese Laid-Open Patent Publication No. 2002-373678 is adopted. In the conventional technique, as shown in FIG. 7, a unit cell 1 includes an electrolyte membrane 2, catalyst electrodes 3a, 3b formed on both surfaces of the electrolyte membrane 2, and gas diffusion electrodes 4a, 4b formed on the catalyst electrodes 3a, 3b oppositely.

The gas diffusion electrodes 4a, 4b are sandwiched between separators 5a, 5b. A fuel gas flow field 6a for supplying a fuel gas to the catalyst electrode 3a is formed between the gas diffusion electrode 4a and the separator 5a, and an oxygen-containing gas flow field 6b for supplying an oxygen-containing gas to the catalyst electrode 3b is formed between the gas diffusion electrode 4b and the separator 5b.

In the unit cell 1, at the time of power generation, water is likely to be produced at the catalyst electrode 3b on the cathode side, and area of the electrolyte membrane 2 to which the catalyst electrode 3b is applied is swelled. Therefore, a dimensional change may occur between the area of the electrolyte membrane 2 to which the catalyst electrodes 3a, 3b are applied, and the area of the electrolyte membrane 2 to which the catalyst electrodes 3a, 3b are applied. The dimensional change may cause stress generation undesirably. Further, edges of the catalyst electrodes 3a, 3b are in the outer boundary area to which the catalyst is applied. In the outer boundary area, the electrolyte membrane 2 may be damaged easily by the stress concentration.

Though the gas diffusion electrodes 4a, 4b are sandwiched by a plurality of protrusions 7a, 7b provided on the separators 5a, 5b, the edges of the catalyst electrodes 3a, 3b are not sandwiched reliably. Thus, in the conventional technique, cracks or the like may be generated in the electrolyte membrane 2 undesirably.

SUMMARY OF THE INVENTION

A main object of the present invention is to provide a fuel cell with a simple structure in which generation of stress in an electrolyte membrane is reliably prevented, and the desired power generation performance is achieved.

According to the present invention, a fuel cell comprises a membrane electrode assembly and a pair of separators sandwiching the membrane electrode assembly. The membrane electrode assembly comprises an electrolyte membrane, a cathode and an anode. The cathode and the anode include electrode catalyst layers provided respectively on both surfaces of the electrolyte membrane. An oxygen-containing gas flow field for supplying an oxygen-containing gas is provided between the cathode and one of the separators and a fuel gas flow field for supplying a fuel gas is provided between the anode and the other of the separators.

The one separator has a first outer protrusion provided outside the oxygen-containing gas flow field, and the other separator has a second outer protrusion provided outside the fuel gas flow field. Outer edges of the electrode catalyst layers are provided in the contact width where the first outer protrusion contacts the cathode and the second outer protrusion contacts the anode.

It is preferable that the contact width of the first outer protrusion which contacts the cathode is larger than the contact width of a first protrusion which is provided in the oxygen-containing gas flow field, and contacts the cathode, and it is preferable that the contact width of the second outer protrusion which contacts the anode is larger than the contact width of a second protrusion which is provided in the fuel gas flow field, and contacts the anode.

Further, it is preferable that an outer edge of the electrode catalyst layer of the anode and an outer edge of the electrode catalyst layer of the cathode sandwiching the electrolyte membrane are out of alignment with each other.

Further, it is preferable that adhesive layers are provided around the electrode catalyst layer of the anode and around the electrode catalyst layer of the cathode, respectively, and it is preferable that gas diffusion layers are provided to cover the electrode catalyst layers and the adhesive layers. Further, it is preferable that the pair of separators are metal separators or carbon separators.

In the present invention, the first outer protrusion of one separator and the second outer protrusion of the other separator reliably sandwich the outer edges of the electrode catalyst layers, i.e., the outer boundary area of the electrode catalyst layers. Therefore, no stress concentration occurs in the electrolyte membrane. Thus, with the simple structure, damage of the solid polymer electrolyte membrane is prevented, and the desired power generation performance can be obtained.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
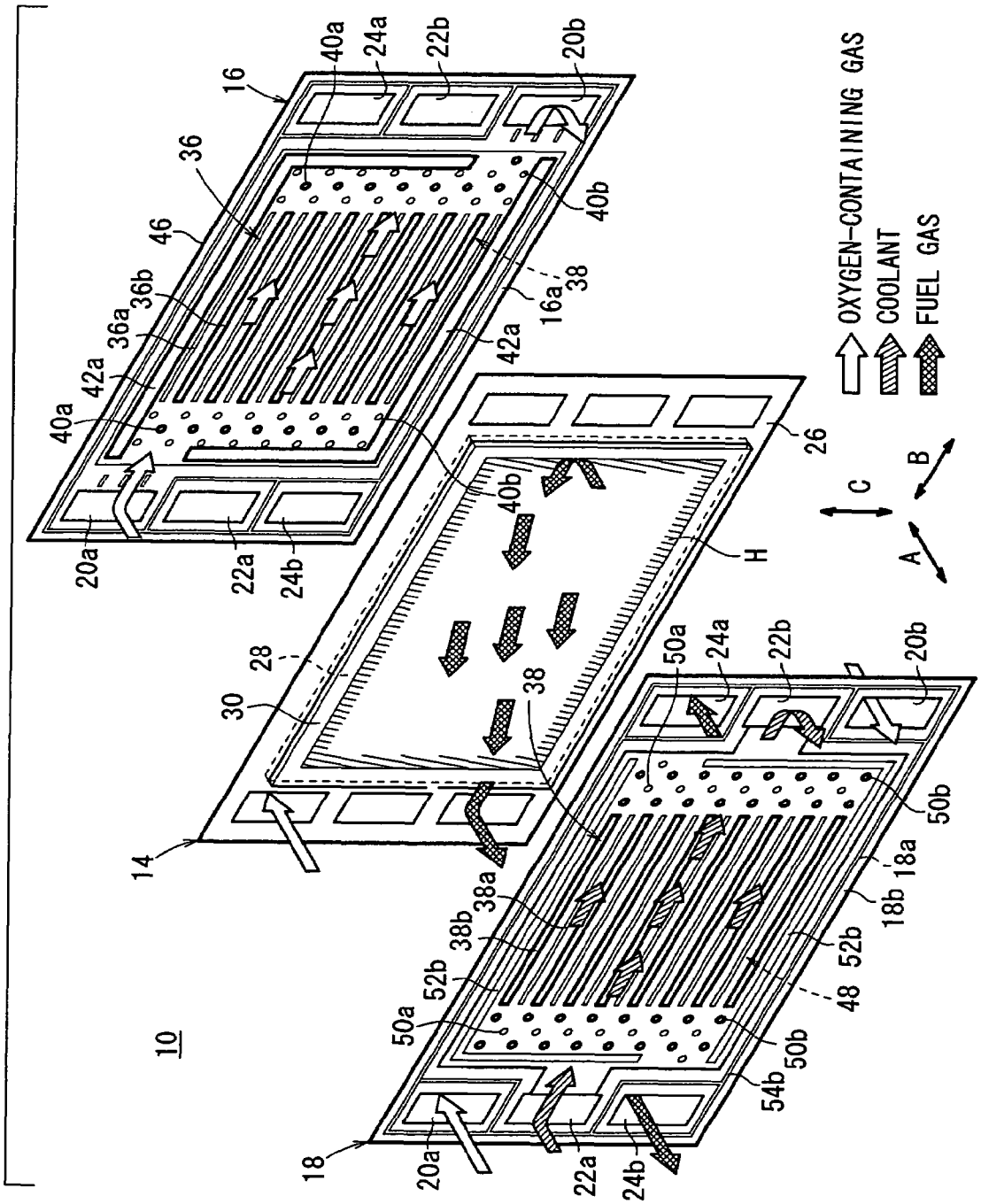
FIG. 1 is a perspective view schematically showing main components of a fuel cell according a first embodiment of the present invention.
Figure 2:
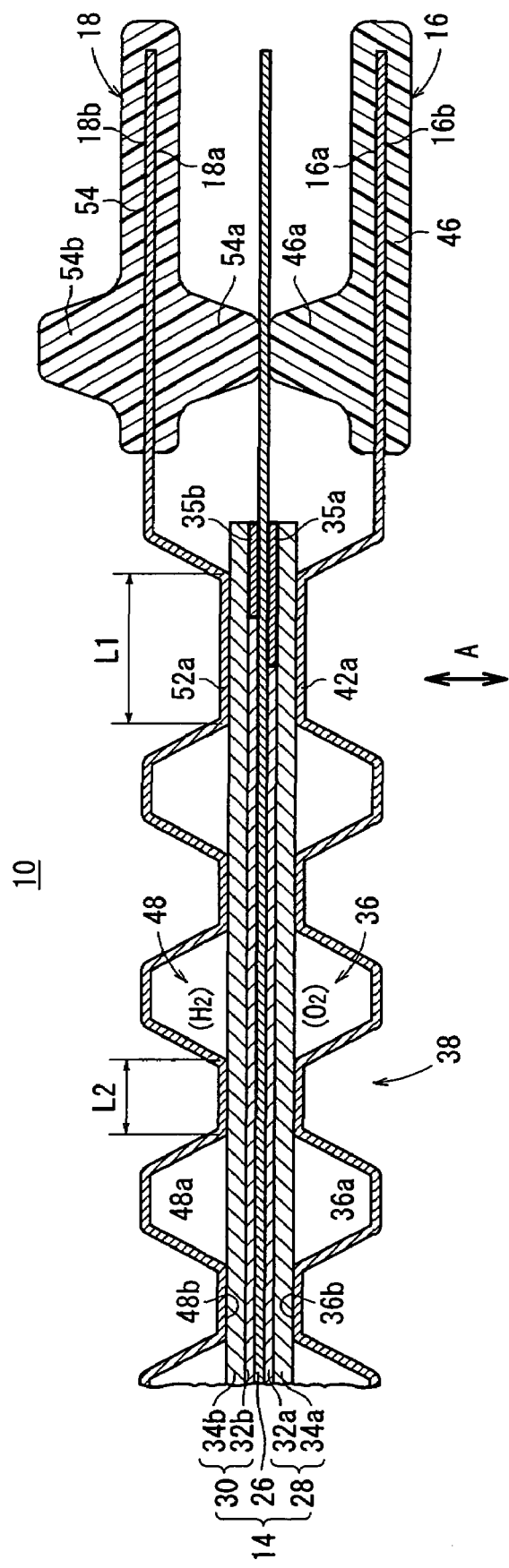
FIG. 2 is a cross sectional view showing part of the fuel cell.

FIG. 1 is a perspective view schematically showing main components of a fuel cell 10 according a first embodiment of the present invention. FIG. 2 is a cross sectional view showing part of the fuel cell 10. A plurality of the fuel cells 10 may be stacked together to form a fuel cell stack.

The fuel cell 10 includes a membrane electrode assembly 14 and first and second metal separators 16, 18 sandwiching the membrane electrode assembly 14. The first and second metal separators 16, 18 are thin metal plates such as steel plates, stainless steel plates, aluminum plates, or plated steel sheets. The first and second metal separators 16, 18 are formed by press forming to have a desired shape.

At one end of the fuel cell 10 in a horizontal direction indicated by an arrow B in FIG. 1, an oxygen-containing gas supply passage 20a for supplying an oxygen-containing gas, a coolant supply passage 22a for supplying a coolant, and a fuel gas discharge passage 24b for discharging a fuel gas such as a hydrogen-containing gas are arranged vertically in a direction indicated by an arrow C. The oxygen-containing gas supply passage 20a, the coolant supply passage 22a, and the fuel gas discharge passage 24b extend through the fuel cell 10 in the direction indicated by the arrow A.

At the other end of the fuel cell 10 in the direction indicated by the arrow B, a fuel gas supply passage 24a for supplying the fuel gas, a coolant discharge passage 22b for discharging the coolant, and an oxygen-containing gas discharge passage 20b for discharging the oxygen-containing gas are arranged in the direction indicated by the arrow C. The fuel gas supply passage 24a, the coolant discharge passage 22b, and the oxygen-containing gas discharge passage 20b extend through the fuel cell 10 in the direction indicated by the arrow A.

The membrane electrode assembly 14 includes a cathode 28, an anode 30, and a solid polymer electrolyte membrane 26 interposed between the cathode 28 and the anode 30. The solid polymer electrolyte membrane 26 is formed by impregnating a thin membrane of perfluorosulfonic acid with water, for example.

As show in FIG. 2, the cathode 28 and the anode 30 include electrode catalyst layers 32a, 32b fixed to both surfaces of the electrolyte membrane 26 and gas diffusion layers 34a, 34b such as carbon papers on the electrode catalyst layers 32a, 32b.

The electrode catalyst layers 32a, 32b are platinum alloy supported on porous carbon particles. The carbon particles are deposited uniformly on the surfaces of the gas diffusion layers 34a, 34b. The surface area of the electrode catalyst layer 32a of the cathode 28 is smaller than the surface area of the electrode catalyst layer 32b of the anode 30. The surface areas of the gas diffusion layers 34a, 34b are larger than the surface areas of the electrode catalyst layers 32a, 32b. Outer edges of the gas diffusion layers 34a, 34b are adhered to the solid polymer electrolyte membrane 26 by adhesive layers 35a, 35b, respectively. As shown in FIG. 1, the area H where the electrode catalyst of the cathode 28 and the anode 30 is applied is inside the outer edges of the gas diffusion layers 34a, 34b.

Figure 3:
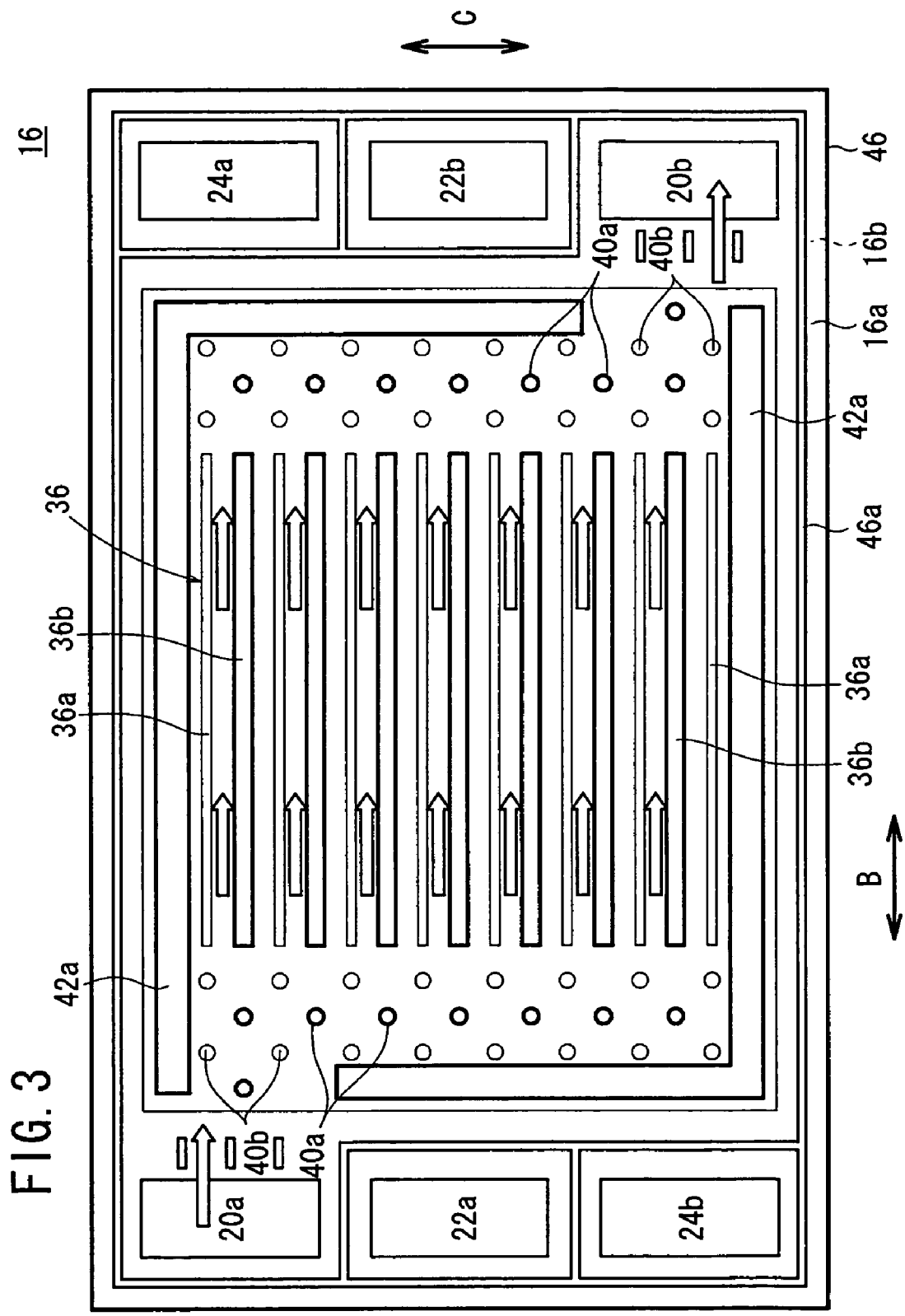
FIG. 3 is a view showing one surface of a first metal separator of the fuel cell.

As shown in FIGS. 1 and 3, the first metal separator 16 has an oxygen-containing gas flow field 36 on its surface 16a facing the membrane electrode assembly 14. The oxygen-containing gas flow field 36 is connected to the oxygen-containing gas supply passage 20a at one end, and connected to the oxygen-containing gas discharge passage 20b at the other end. The first metal separator 16 has a coolant flow field 38 on its surface 16b opposite to the surface 16a. The coolant flow field 38 is formed between the surface 16b and the second metal separator 18. The coolant flow field 38 is connected to the coolant supply passage 22a at one end, and connected to the coolant discharge passage 22b at the other end (see FIG. 4). The oxygen-containing gas flow field 36 and the coolant flow field 38 are formed on both surfaces 16a, 16b of the first metal separator 16 by press forming.

Figure 4:
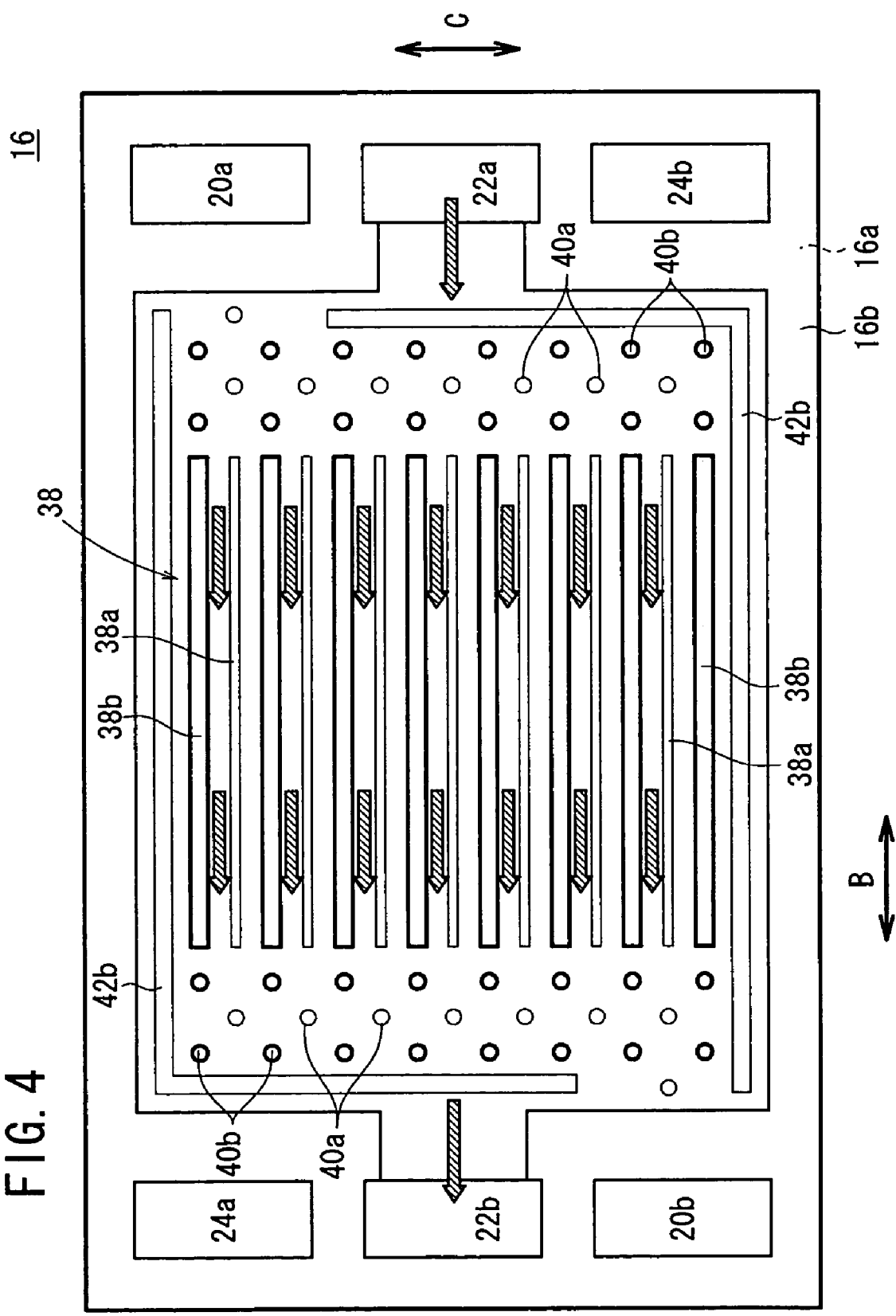
FIG. 4 is a view showing the other surface of the first metal separator.

Specifically, for example, the first metal separator 16 is formed to have a corrugated shape such that a plurality of grooves 36a forming the oxygen-containing gas flow field 36 are provided on the surface 16a, and a plurality of grooves 38a forming the coolant flow field 38 are provided on the surface 16b. As shown in FIGS. 3 and 4, first protrusions 36b on the surface 16a are formed by providing the grooves 38a on the surface 16b, and first protrusions 38b on the surface 16b are formed by providing the grooves 36a on the surface 16a.

On the surface 16a, the grooves 36a extend substantially straight in the direction indicated by the arrow B. On opposite sides of the grooves 36a in the direction indicated by the arrow B, a plurality of projections 40a are provided, e.g., by embossing. Likewise, on the surface 16b, the grooves 38a extend substantially straight in the direction indicated by the arrow B. On opposite sides of the grooves 38a in the direction indicated by the arrow B, a plurality of projections 40b are provided, e.g., by embossing.

Further, as shown in FIG. 3, on the surface 16a, two first outer protrusions 42a each having a substantially L-shape for guiding the oxygen-containing gas from the oxygen-containing gas supply passage 20a to the oxygen-containing gas discharge passage 20b are provided outside the oxygen-containing gas flow field 36. As shown in FIG. 2, at the first outer protrusions 42a, the outer edge of the electrode catalyst layer 32a of the cathode 28 is provided at a substantially middle position along the width of first outer protrusions 42a.

The contact width L1 of the first outer protrusion 42a (the width of the first outer protrusion 42a which contacts the cathode 28) is larger than the contact width L2 of the first protrusion 36b (the width of first protrusion 36b which contacts the cathode 28). Therefore, as describe later, it is possible to absorb the dimensional displacement of the electrode catalyst layer 32a sufficiently, and the outer edge of the electrode catalyst layer 32a is reliably supported by the first outer protrusions 42a. As shown in FIG. 4, on the surface 16b, two first recesses 42b each having a substantially L-shape is formed. The first recesses 42b are formed by the back surfaces of the first outer protrusions 42a.

A first seal member 46 is formed integrally on the surfaces 16a, 16b of the first metal separator 16, e.g., by heat treatment, injection molding, or the like, to cover (sandwich) the outer edge of the first metal separator 16. The first seal member 46 is made of seal material, cushion material or packing material such as EPDM (Ethylene Propylene Diene Monomer), NBR (Nitrile Butadiene Rubber), fluoro rubber, silicone rubber, fluoro silicone rubber, butyl rubber (Isobutene-Isoprene Rubber), natural rubber, styrene rubber, chloroprene rubber, or acrylic rubber.

The first seal member 46 includes a line seal 46a provided around the oxygen-containing gas flow field 36 on the surface 16a. The line seal 46a is not provided between the oxygen-containing gas supply passage 20a and the oxygen-containing gas flow field 36, and between the oxygen-containing gas discharge passage 20b and the oxygen-containing gas flow field 36. Thus, the oxygen-containing gas flow field 36 is connected to the oxygen-containing gas supply passage 20a and the oxygen-containing gas discharge passage 20b on the surface 16a (see FIG. 3).

Figure 5:
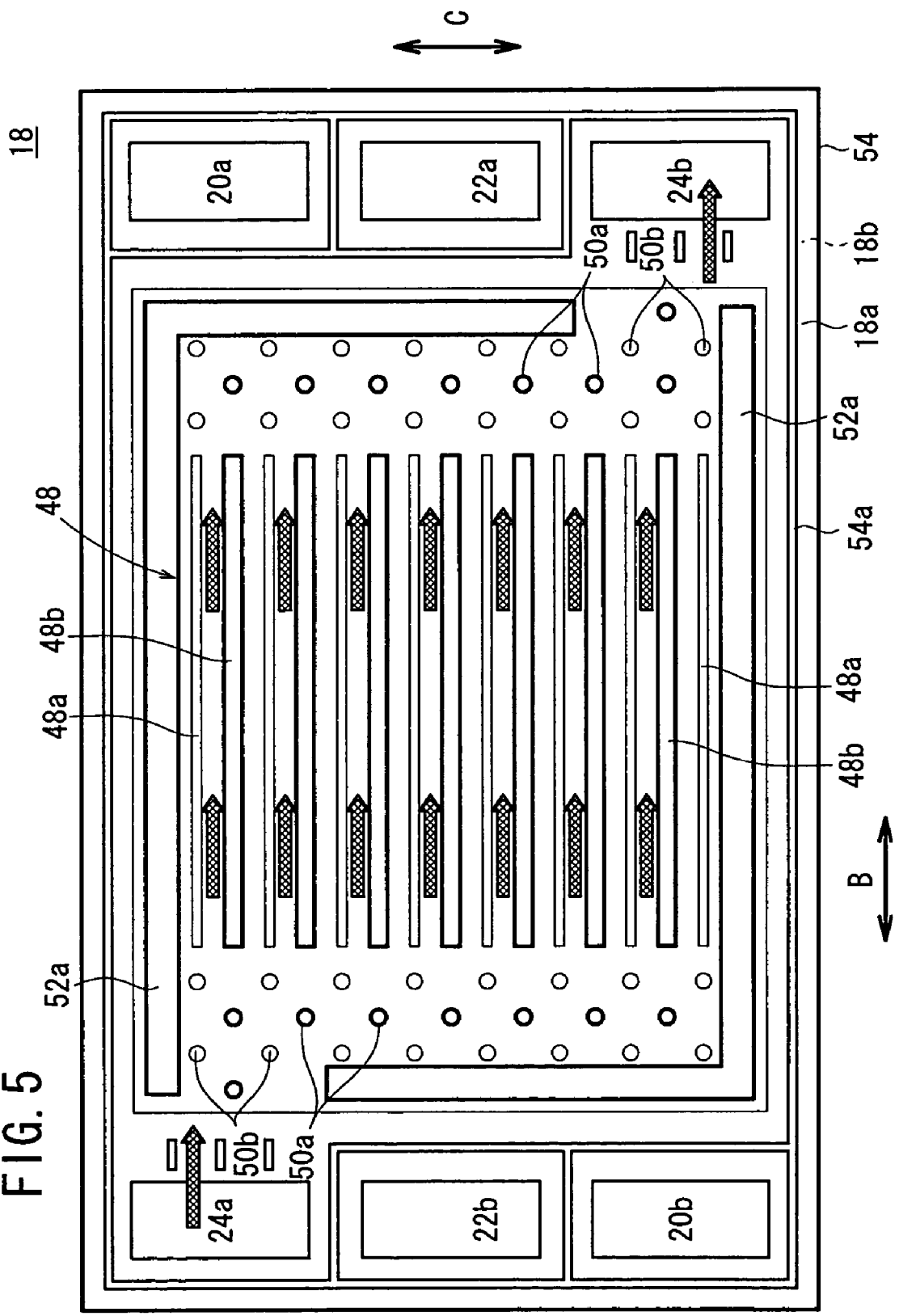
FIG. 5 is a front view showing a second metal separator of the fuel cell.

As shown in FIGS. 1 and 5, the second metal separator 18 has a fuel gas flow field 48 on its surface 18a facing the membrane electrode assembly 14. The fuel gas flow field 48 is connected to the fuel gas supply passage 24a at one end, and connected to the fuel gas discharge passage 24b at the other end.

As shown in FIG. 1, the second metal separator 18 has a coolant flow field 38 on its surface 18b opposite to the surface 18a. The coolant flow field 38 is formed between the surface 18b and the first metal separator 16. The coolant flow field 38 is connected to the coolant supply passage 22a at one end, and connected to the coolant discharge passage 22b at the other end. The fuel gas flow field 48 and the coolant flow field 38 are formed on both surfaces 18a, 18b of the second metal separator 18 by press forming.

Specifically, for example, the second metal separator 18 is formed to have a corrugated shape such that a plurality of grooves 48a forming the fuel gas flow field 48 are provided on the surface 18a (see FIG. 5), and a plurality of grooves 48a forming the coolant flow field 38 are provided on the surface 18b (see FIG. 1). Second protrusions 48b on the surface 18a are formed by providing the grooves 38a on the surface 18b, and first protrusions 38b on the surface 16b are formed by providing the grooves 48a on the surface 18b.

On the surface 18a, the grooves 38a extend substantially straight in the direction indicated by the arrow B. On opposite sides of the grooves 48a in the direction indicated by the arrow B, a plurality of projections 50a are provided, e.g., by embossing. Likewise, on the surface 18b, the grooves 38a extend substantially straight in the direction indicated by the arrow B. On opposite sides of the grooves 38a in the direction indicated by the arrow B, a plurality of projections 50b are provided, e.g., by embossing.

Further, as shown in FIG. 5, on the surface 18a, two second outer protrusions 52a each having a substantially L-shape for guiding the fuel gas from the fuel gas supply passage 24a to the fuel gas discharge passage 24b are provided outside the fuel gas flow field 48. As shown in FIG. 2, at the second outer protrusions 52a, the outer edge of the electrode catalyst layer 32b of the anode 30 is provided at a substantially middle position along the width of second outer protrusions 52a.

The contact width L1 of the second outer protrusion 52a (the width of the second outer protrusion 52a which contacts the anode 30) is larger than the contact width L2 of the second protrusion 48b (the width of second protrusion 48b which contacts the anode 30). Therefore, as describe later, it is possible to absorb the dimensional displacement of the electrode catalyst layer 32b sufficiently, and the outer edge of the electrode catalyst layer 32b is reliably supported by the second outer protrusions 52a. As shown in FIG. 1, on the surface 18b, two second recesses 52b each having a substantially L-shape is formed. The second recesses 52b are formed by the back surfaces of the second outer protrusions 52a.

A second seal member 54 is formed integrally on the surfaces 18a, 18b of the second metal separator 18, e.g., by heat treatment, injection molding, or the like, to cover (sandwich) the outer edge of the second metal separator 18. The material used for the second seal member 54 is the same as the material used for the first seal member 46. The second seal member 54 includes a line seal 54a provided around the fuel gas flow field 48 on the surface 18a. The line seal 54a is not provided between the fuel gas supply passage 24a and the fuel gas flow field 48, and between the fuel gas discharge passage 24b and the fuel gas flow field 48. Thus, the fuel gas flow field 48 is connected to the fuel gas supply passage 24a and the fuel gas discharge passage 24b on the surface 18a (see FIG. 5).

A line seal 54b is provided around the coolant flow field 38 on the surface 18b. The line seal 54a is not provided between the coolant supply passage 22a and the coolant flow field 38, and between the coolant discharge passage 22b and the coolant field 38. Thus, the coolant flow field 38 is connected to the coolant supply passage 22a and the coolant discharge passage 22b on the surface 18b (see FIG. 1).

Next, operation of the fuel cell 10 will be described below.

As shown in FIG. 1, an oxygen-containing gas is supplied to the oxygen-containing gas supply passage 20a, and a fuel gas such as a hydrogen-containing gas is supplied to the fuel gas supply passage 24a. Further, a coolant such as pure water, an ethylene glycol, or an oil is supplied to the coolant supply passage 22a.

As shown in FIGS. 1 and 3, the oxygen-containing gas flows from the oxygen-containing gas supply passage 20a into the oxygen-containing gas flow field 36 of the first metal separator 16. The oxygen-containing gas flows along the cathode 28 of the membrane electrode assembly 14 for inducing an electrochemical reaction at the cathode 28. Likewise, as shown in FIGS. 1 and 5, the fuel gas flows from the fuel gas supply passage 24a into the fuel gas flow field 48 of the second metal separator 18. The fuel gas flows along the anode 30 of the membrane electrode assembly 14 for inducing an electrochemical reaction at the anode 30.

Thus, in each of the membrane electrode assemblies 14, the oxygen-containing gas supplied to the cathode 28, and the fuel gas supplied to the anode 30 are consumed in the electrochemical reactions at catalyst layers of the cathode 28 and the anode 30 for generating electricity (see FIG. 2).

Then, after the oxygen-containing gas is consumed at the cathode 28, the oxygen-containing gas is discharged into the oxygen-containing gas discharge passage 20b (see FIG. 3). Likewise, after the fuel gas is consumed at the anode 30, the fuel gas is discharged into the fuel gas discharge passage 24b (see FIG. 5).

The coolant supplied to the coolant supply passage 22a flows into the coolant flow field 38 between the first and second metal separators 16, 18. After the coolant cools the membrane electrode assembly 14, the coolant is discharged into the coolant discharge passage 22b (see FIG. 1).

In the first embodiment, the first metal separator 16 has the first outer protrusions 42a outside the oxygen-containing gas flow field 36, and the second metal separator 18 has the second outer protrusions 52a outside the fuel gas flow field 48.

As shown in FIG. 2, the first and second outer protrusions 42a, 52a sandwich the outer edges, i.e., outer boundary areas of the electrode catalyst layers 32a, 32b of the membrane electrode assembly 14. Therefore, even if the solid polymer electrolyte membrane 26 is swelled by the water produced in the power generation, stress concentration does not occur at outer edges of the electrode catalyst layers 32a, 32b. Further, the outer edge of the electrode catalyst layer 32a and the outer edge of the electrode catalyst layer 32b are provided at different positions, i.e., the position of the outer edge of the electrode catalyst layer 32a is out of alignment with the position of the outer edge of the electrode catalyst layer 32b in the stacking direction. Thus, it is possible to prevent stress concentration in the solid polymer electrolyte membrane 26.

Therefore, in the first embodiment, damage of the solid polymer electrolyte membrane 26 is prevented. With the simple structure, the desired power generation performance can be achieved advantageously.

Further, in the first embodiment, the first and second outer protrusions 42a, 52a are wider than the first and second protrusions 36b, 48b in the oxygen-containing gas flow field 36 and the fuel gas flow field 48. Specifically, as shown in FIG. 2, the contact width L1 of the first and second outer protrusions 42a, 52a is larger than the contact length L2 of the first and second protrusions 36b, 48b.

Positional displacement is likely to occur between the first and second metal separators 16, 18 and the outer edges of the electrode catalyst layers 32a, 32b. Specifically, the positional displacement may occur at the time of applying the electrode catalyst on the solid polymer electrolyte membrane 26, at the time of combining the solid polymer electrolyte membrane 26 and the gas diffusion layers 34a, 34b together, at the time of combining the first and second metal separators 16, 18 and the membrane electrode assembly 14 together, at the time of forming the first and second metal separators 16, 18 by press forming, and at the time of stacking the first and second metal separators 16, 18 together.

Therefore, in the first embodiment, the first and second outer protrusions 42a, 52a are wider than the first and second protrusions 36b, 48b for effectively absorbing the positional displacement effectively, and reliably sandwiching the outer edges of the electrode catalyst layers 32a, 32b between the first and second outer protrusions 42a, 52a. Thus, damage of the solid polymer electrolyte membrane 26 is prevented, and the desired power generation performance can be maintained advantageously.

Figure 6:
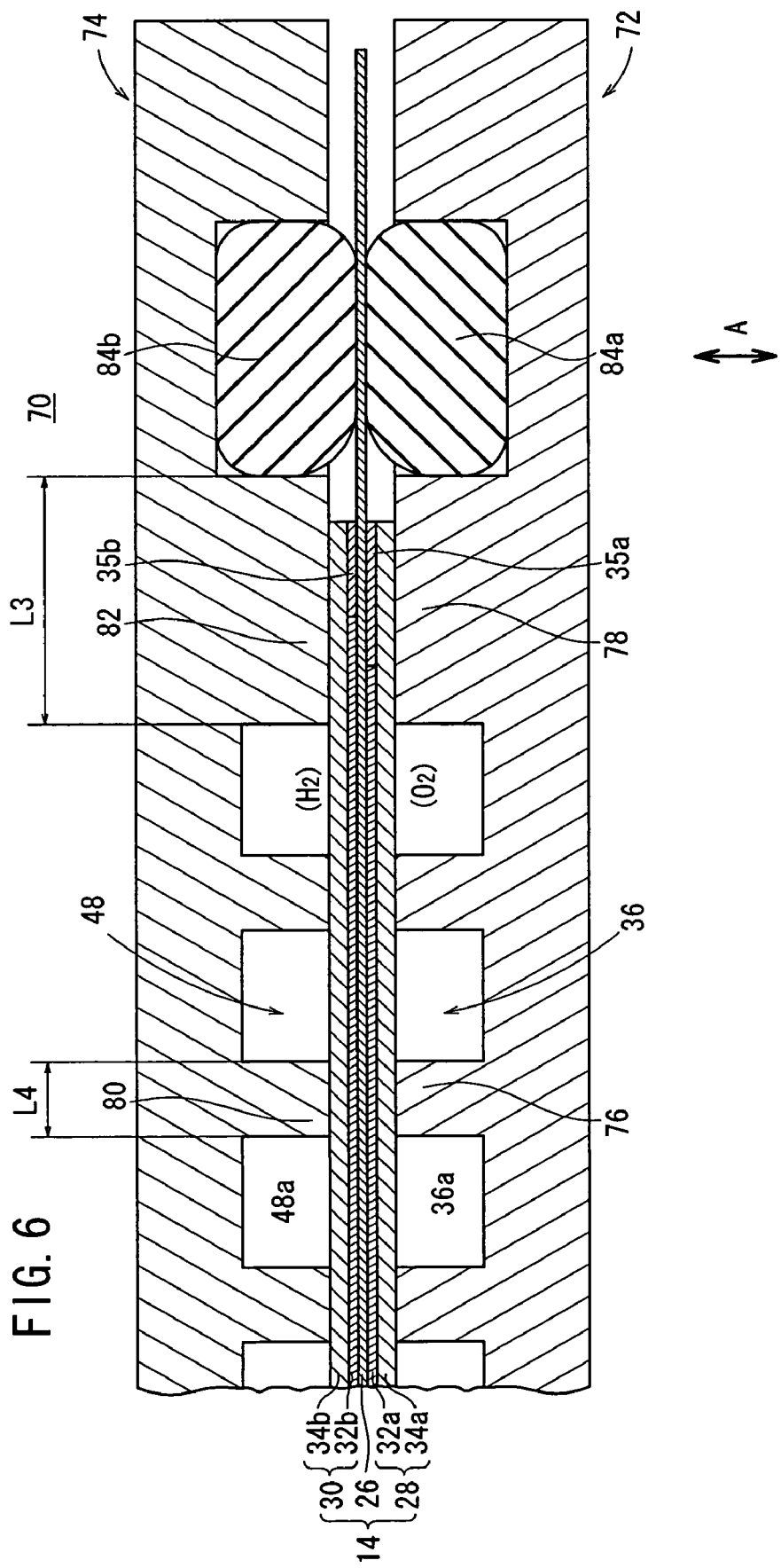
FIG. 6 is a cross sectional view showing part of a fuel cell according to a second embodiment of the present invention.
Figure 7:
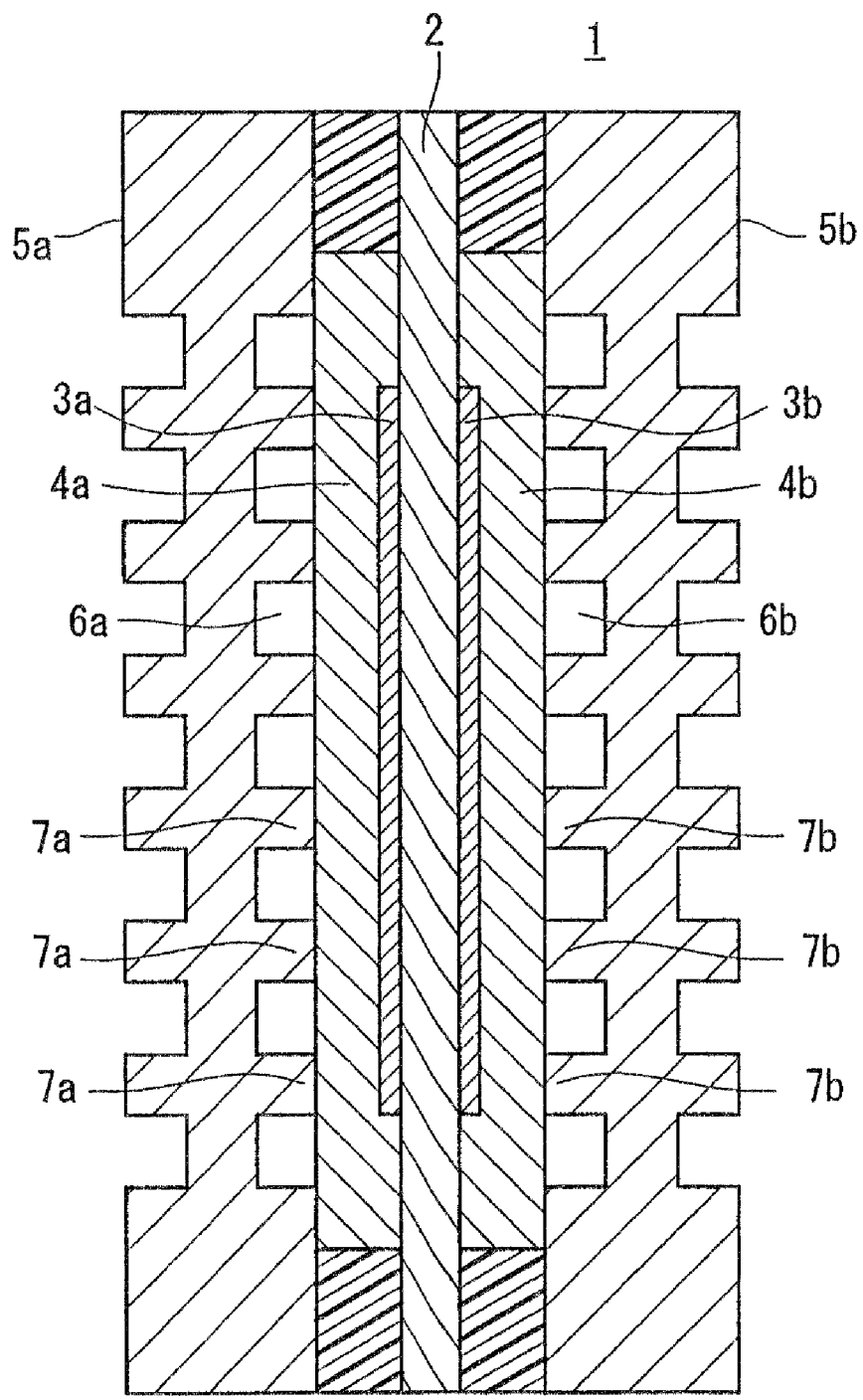
FIG. 7 is a cross sectional view showing a conventional fuel cell.

FIG. 6 is a partial cross sectional view showing a fuel cell 70 according to a second embodiment of the present invention. The constituent elements that are identical to those of the fuel cell 10 according to the first embodiment are labeled with the same reference numeral, and description thereof will be omitted.

The fuel cell 70 includes first and second carbon separators 72, 74 sandwiching the membrane electrode assembly 14. The first carbon separator 72 has first protrusions 76 forming a plurality of grooves 36a of an oxygen-containing gas flow field 36. Further, a first outer protrusion 78 is provided outside the oxygen-containing gas flow field 36. The contact width L3 of the first outer protrusion 78 is larger than the contact width L4 of the first protrusions 76. The second carbon separator 74 has second protrusions 80 forming a plurality of grooves 48a of a fuel gas flow field 48. Further, a second outer protrusion 82 is provided outside the fuel gas flow field 48. The contact width L3 of the second outer protrusion 82 is larger than the contact width L4 of the second protrusions 80. Seal members 84a, 84b are interposed between outer edges of the solid polymer electrolyte membrane 26 and the first and second separators 72, 74.

In the second embodiment, the first and second outer protrusions 78, 82 of the first and second carbon separators 72, 74 reliably sandwich the outer edges of electrode catalyst layers 32a, 32b. The contact width L3 of the first and second outer protrusions 78, 82 is larger than the contact width L4 of the first and second protrusions 76, 80. Thus, with the simple structure, the same advantages as with the first embodiment can be obtained. For example, damage of the solid polymer electrolyte membrane 26 is prevented, and the desired power generation performance can be obtained.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising a membrane electrode assembly and a pair of separators sandwiching said membrane electrode assembly, said membrane electrode assembly comprising an electrolyte membrane, and a cathode and an anode including electrode catalyst layers provided respectively on both surfaces of said electrolyte membrane, wherein an oxygen-containing gas flow field for supplying an oxygen-containing gas is provided between said cathode and one of said separators and a fuel gas flow field for supplying a fuel gas is provided between said anode and the other of said separators, and wherein adhesive layers are provided around said electrode catalyst layer of said anode and around said electrode catalyst layer of said cathode, respectively;

gas diffusion layers are provided on said electrode catalyst layer of said anode and on said electrode catalyst layer of said cathode, respectively, said gas diffusion layers covering said electrode catalyst layers and said adhesive layers;

said one separator comprises a plurality of non-contacting protrusions that are spaced from the cathode and a plurality of contacting protrusions that contact the cathode, wherein the plurality of contacting protrusions include at least one first outer contacting protrusion provided outside said oxygen-containing gas flow field, said first outer contacting protrusion contacting the cathode along a contact width;

said other separator comprises a plurality of non-contacting protrusions that are spaced from the anode and a plurality of contacting protrusions that contact the anode, wherein the plurality of contacting protrusions include at least one second outer contacting protrusion provided outside said fuel gas flow field, said second outer contacting protrusion contacting the anode along the contact width; and outer edges of said electrode catalyst layers are provided within the contact width, sandwiched between the first outer contacting protrusion contacting the cathode and the second outer contacting protrusion contacting the anode.

2. A fuel cell according to claim 1, wherein the contact width of said first outer contacting protrusion which contacts said cathode is larger than the contact width of a first contacting protrusion which is provided in said oxygen-containing gas flow field, and contacts said cathode; and the contact width of said second outer contacting protrusion which contacts said anode is larger than the contact width of a second contacting protrusion which is provided in said fuel gas flow field, and contacts said anode.

3. A fuel cell according to claim 1, wherein the outer edge of said electrode catalyst layer of said anode and the outer edge of said electrode catalyst layer of said cathode sandwiching said electrolyte membrane are out of alignment with each other.

4. A fuel cell according to clam 1, wherein said pair of separators are metal separators.

5. A fuel cell according to claim 1, wherein said pair of separators are carbon separators.

6. A fuel cell according to claim 1, further comprising:

a first seal member formed integrally on the one separator to cover an outer edge of the one separator, the first seal member includes a first line seal portion protruding from the first seal member, the first line seal portion being provided around the oxygen-containing gas flow field so as to contact the electrolyte membrane, a second seal member formed integrally on the other separator to cover an outer edge of the other separator, the second seal member comprising a second line seal portion protruding from the second seal member, the second line seal portion being provided around the fuel gas flow field so as to contact the electrolyte membrane, wherein the electrolyte membrane is sandwiched between the first line seal portion and the second line seal portion.

* * * * *